United States Patent [19]

Forehand

[11] Patent Number: 4,717,867
[45] Date of Patent: Jan. 5, 1988

[54] APPARATUS FOR CONSERVING POWER IN OPERATING A LOAD

[75] Inventor: Gilbert H. Forehand, Duncan, Okla.
[73] Assignee: Halliburton Company, Duncan, Okla.
[21] Appl. No.: 948,266
[22] Filed: Dec. 31, 1986
[51] Int. Cl.[4] .............................................. G05F 1/44
[52] U.S. Cl. ...................................... 323/223; 323/274
[58] Field of Search ............................... 363/21, 97; 323/222–226, 231, 268, 274, 284, 220

[56] References Cited

U.S. PATENT DOCUMENTS

| | | | |
|---|---|---|---|
| 3,909,696 | 9/1975 | Katou et al. | 363/21 |
| 4,037,271 | 7/1977 | Keller | 363/21 |
| 4,156,273 | 5/1979 | Sato | 363/21 X |
| 4,236,187 | 11/1980 | Mochizuki et al. | 363/21 X |
| 4,322,787 | 3/1982 | Kraus | 323/222 |

Primary Examiner—Peter S. Wong
Attorney, Agent, or Firm—James R. Duzan; E. Harrison Gilbert, III

[57] ABSTRACT

A load, such as a control circuit for a DC/DC converter, is initially operated by an initial load powering voltage developed by a power consuming regulator until another voltage, such as the DC/DC converter's output voltage derived from an input voltage used by the voltage regulator to establish the initial load powering voltage, reaches a predetermined level. A switching control circuit initially allows the regulator to operate and connects its output to the load. The switching control circuit, however, responds to the other voltage so that when this other voltage reaches the predetermined magnitude, the switching control circuit prevents the regulator from further operating and thus from further dissipating energy. The switching control circuit then connects the other voltage to power the load. The switching control circuit is designed so that it dissipates less energy than the regulator when the switching control circuit disables the regulator and allows the other voltage to power the load.

17 Claims, 4 Drawing Figures

APPARATUS FOR CONSERVING POWER IN OPERATING A LOAD

BACKGROUND OF THE INVENTION

This invention relates generally to power circuits for providing power to a load with the power coming initially from a first voltage and subsequently from a second voltage when the second voltage reaches a requisite magnitude. The present invention relates more particularly, but not by way of limitation, to apparatus for applying a voltage to an input of a control circuit of a means for converting a direct current input voltage to a regulated direct current output voltage, which applied voltage is initially taken from the input voltage and subsequently from the output voltage.

Devices for converting a direct current input voltage to a lower magnitude direct current output voltage are well known. Such devices include a converter control circuit and one or more switching circuits operated in response to the control circuit to achieve the voltage level conversion. These devices, referred to as DC/DC converters, generally require operating power to be provided at some low stable voltage for their internal control circuits. Such stable low voltage is generally provided through either a series pass regulator circuit or a shunt regulator circuit across which the input voltage is applied.

When one of these types of DC/DC converters has an applied input voltage with a magnitude considerably greater than the stable low voltage which is to be used to power the internal control circuit, significant energy is dissipated in either the series pass or shunt regulation circuit used to achieve this considerably lower voltage. Such dissipation can severely reduce the efficiency of the DC/DC converter. This dissipation can also create high internal operating temperatures or require special heat sinking to prevent such high temperatures from occurring. Such dissipation is a direct function of the difference between the applied input voltage and the lower voltage at which the control circuit power is provided by either the shunt or series pass regulation circuit.

An example of where such relatively high energy dissipation occurs is in instrumentation used in diesel locomotives. Some of the modern instrumentation in such locomotives includes integrated circuits requiring a nominal voltage level of $+12$ $V_{DC}$, for example; however, the voltage supply maintained on a diesel locomotive is at a nominal $+72$ $V_{DC}$. Therefore, such instrumentation must include a DC/DC converter to step the $+72$ $V_{DC}$ supply down to the appropriate operating level for the instrumentation. Such a DC/DC converter has an internal control circuit which must be powered at a voltage level comparable to the output level to be generated by the converter (e.g., $+12$ $V_{DC}$). To bring the $+72$ $V_{DC}$ supply to this operating level, a conversion circuit of the aforementioned series pass or shunt regulator type has been used; however, this type of circuit when used continuously to power the internal control circuit dissipates substantial energy as a result of the large differential between the $+72$-volt input and the stable low voltage to be provided by the series pass or shunt regulator circuit for powering the internal control circuit.

Because of this significant energy dissipation resulting from the continuous use of such a regulator circuit, there is the need for a new apparatus which can provide a stable low voltage to power the internal control circuit of a DC/DC converter (or some other suitable load) with less energy dissipation than results from the present technique of continuously utilizing a series pass or shunt regulator circuit to power the load.

SUMMARY OF THE INVENTION

The present invention overcomes the above-noted and other shortcomings of the prior art by providing a novel and improved apparatus for conserving power in operating a load, particularly a DC/DC converter (which particular type of load will be referred to throughout by way of example and ease of description). Because the control circuit of a DC/DC converter is typically energized at a voltage level comparable to a self-generated regulated voltage to be provided at the output of the switching circuits of the DC/DC converter, the present invention in this particular use ultimately uses this self-generated output voltage to power its own control circuit in a less energy dissipating manner once the output voltage has reached its regulated magnitude. Prior to when this magnitude is reached, a suitable series pass or shunt regulation circuit provides power in a relatively high energy dissipating manner similar to how such a circuit has been previously used. The present invention is constructed to automatically switch from the higher energy dissipating series pass or shunt circuit to the regulated output voltage once the regulated output voltage reaches its regulated magnitude. Once this occurs, the series pass or shunt regulation circuit is disabled to stop further energy dissipation by such initially used circuit. This disablement occurs through a circuit that dissipates less energy than the series pass or shunt regulator circuit.

More broadly, the apparatus of the present invention provides electric power relative to a first voltage until a second voltage reaches a predetermined magnitude. This apparatus comprises first electrical circuit means for providing to an output terminal, in response to the first voltage, a voltage substantially equal to the predetermined magnitude and less than the first voltage so that a current flows through the first electrical circuit means and the output terminal when an electrical load is connected to the output terminal and the first voltage is applied to the first electrical circuit means. This apparatus also comprises second electrical circuit means for enabling the first electrical circuit means to provide the voltage substantially equal to the predetermined magnitude until the second voltage reaches the predetermined magnitude and for thereafter providing the second voltage to the output terminal so that the current ceases flowing through the first electrical circuit means.

In a particular embodiment the apparatus applies a voltage to an input of a control circuit of a DC/DC converter which converts a direct current input voltage, $V_{IN}$, to a regulated direct current output voltage, $V_O$. This embodiment more particularly comprises: power means for providing from $V_{IN}$ an initial control circuit voltage having a magnitude substantially equal to the regulated magnitude of $V_O$; control means, responsive to $V_O$, for preventing the power means from providing the initial control circuit voltage when the means for converting provides $V_O$; and means for communicating the initial control circuit voltage to the input of the control circuit when the power means provides the initial control circuit voltage and for communicating $V_O$ to the input of the control circuit when the control means prevents the power means from providing the initial control circuit voltage so that the control circuit is energized by the initial control circuit voltage until $V_O$ is provided at its regulated magnitude.

Therefore, from the foregoing, it is a general object of the present invention to provide a novel and improved apparatus for providing electric power relative to a first voltage until a second voltage reaches a predetermined magnitude. It is a more particular object of the present invention to provide such an apparatus for conserving power in DC/DC converters by ultimately operating an internal control circuit of the converter from a self-generated voltage once that voltage reaches a suitable magnitude. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
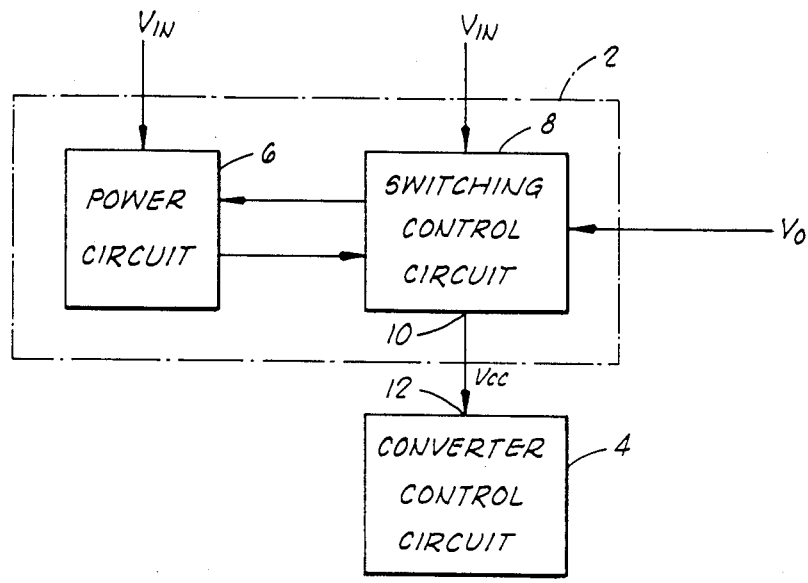
FIG. 1 is a block diagram of the preferred embodiment of the present invention used to provide a voltage to a control circuit of a DC/DC converter.

Represented in FIG. 1 is an apparatus 2 for providing power, at a nominal control circuit voltage $V_{CC}$, to a control circuit 4 of a direct current-to-direct current (DC/DC) converter which converts a direct current input voltage, $V_{IN}$ to a regulated direct current output voltage, $V_O$. The control circuit 4 and the overall DC/DC converter are of suitable types known to the art and do not constitute part of the present invention; therefore, the circuit 4 and the DC/DC converter will not be further described.

It is to be noted that the control circuit 4 is not to be taken as limiting the scope of the utility of the present invention. Thus, the control circuit 4 can be viewed as representing any suitable load to be powered by the present invention which, in general, provides electric power relative to a first voltage until a second voltage reaches a predetermined magnitude, such as one derived from the first voltage. Although the present invention can have broader application, the preferred embodiments of the invention will be described with reference to energizing the control circuit 4 of a DC/DC converter which specifically converts the first voltage $V_{IN}$ to the second voltage $V_O$.

The apparatus 2 in general includes first electrical circuit means (power circuit 6 in FIG. 1) for providing in response to the first voltage ($V_{IN}$ in FIG. 1) a voltage substantially equal to the predetermined magnitude which the second voltage is to obtain and less than the first voltage so that a current flows through the first electrical circuit means and an output terminal (a terminal 10 in FIG. 1) when an electrical load is connected to the output terminal and the first voltage is applied to the first electrical circuit means. The apparatus 2 also includes second electrical circuit means (a switching circuit 8 in FIG. 1) for enabling the first electrical circuit means to provide the voltage which is substantially equal to the predetermined magnitude until the second voltage ($V_O$ in FIG. 1) reaches the predetermined magnitude and for thereafter providing the second voltage to the output terminal so that the current ceases flowing through the first electrical circuit means. The two electrical circuit means include respective portions of a means for switchably communicating one of two voltages from the common output terminal 10 to a common input terminal 12 of the control circuit 4 as the voltage $V_{CC}$. These two portions of this communicating means are included as part of the switching control circuit 8 shown in FIG. 1.

In the preferred embodiment used with the applied voltage $V_{IN}$ which is converted to the output voltage $V_O$, the power circuit 6 includes power means for providing from $V_{IN}$ an initial control circuit voltage having a magnitude substantially equal to the regulated magnitude of $V_O$. Thus, this power means is a voltage conversion means for converting $V_{IN}$ to the initial control circuit voltage which will be temporarily used by the present invention to provide $V_{CC}$ for energizing the control circuit 4. This temporary use continues until $V_O$ reaches its predetermined, regulated magnitude.

Figure 2:
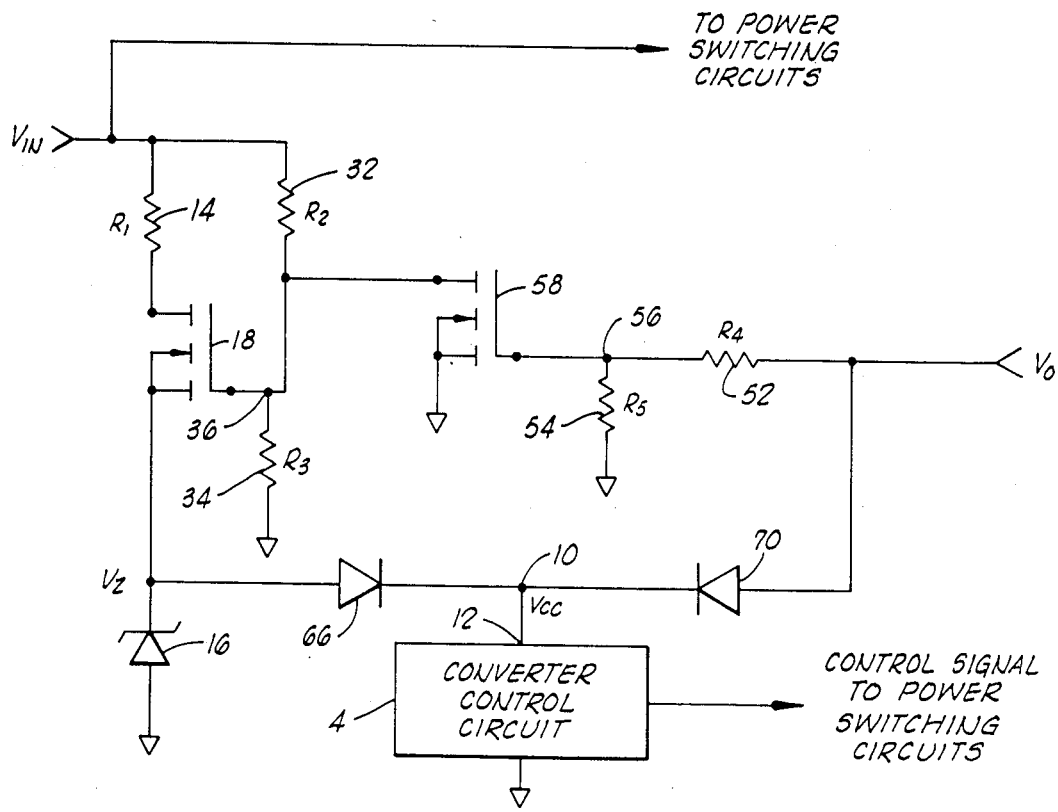
FIG. 2 is a schematic circuit diagram of a particular implementation of the preferred embodiment of the present invention using a shunt regulation circuit.
Figure 3:
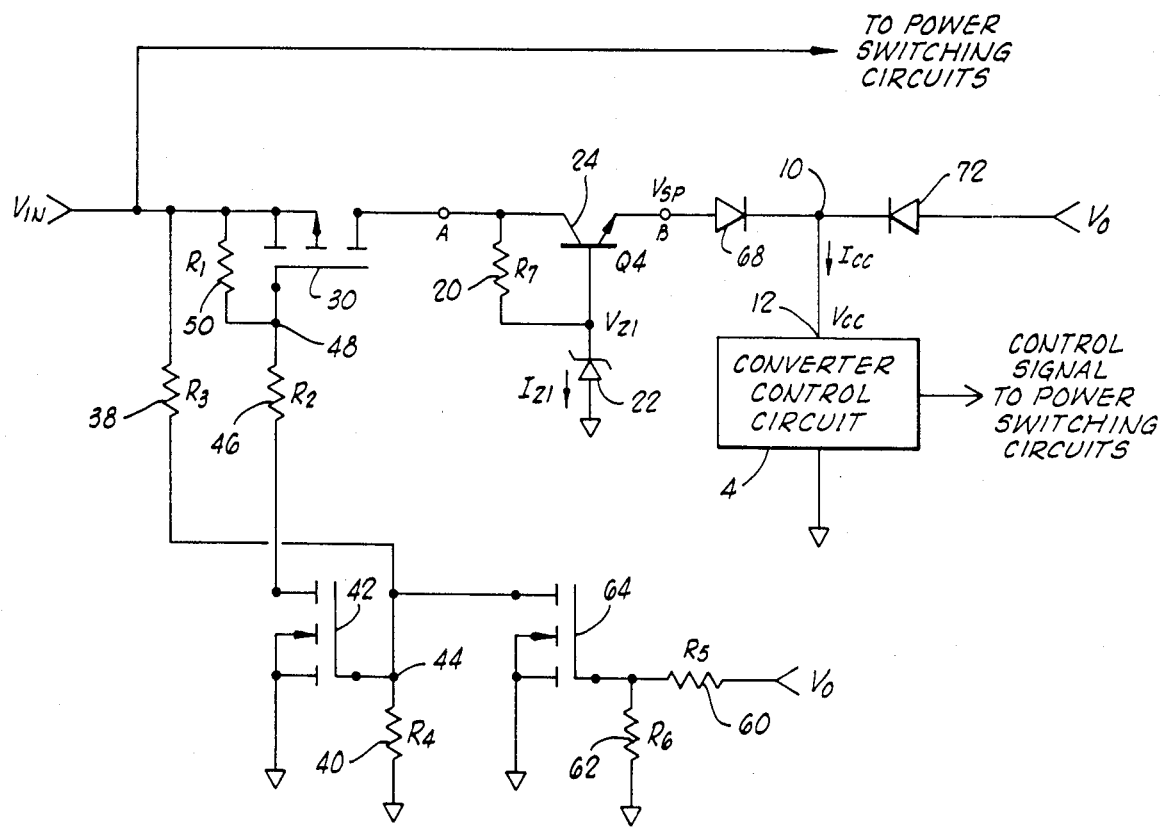
FIG. 3 is a schematic circuit diagram of another particular implementation of the preferred embodiment of the present invention, this implementation utilizing a series pass regulation circuit.
Figure 4:
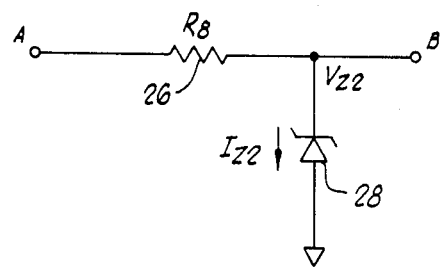
FIG. 4 is a schematic circuit diagram of a shunt regulation circuit which can be substituted for the series pass regulation circuit of the particular embodiment shown in FIG. 3.

In the preferred embodiments shown in FIGS. 2, 3, and 4, the voltage conversion means is specifically a voltage regulator which provides a regulated voltage in response to $V_{IN}$. In the preferred embodiments this regulation holds an electrical conductor at a magnitude substantially equal to the predetermined magnitude of which the output voltage $V_O$ is to be regulated. It is to be noted that "substantially equal" includes being exactly equal in magnitude to the specified reference as well as some variation therefrom. In the preferred embodiments the voltage regulation is provided by either a shunt voltage regulator or a series pass voltage regulator.

A shunt regulator shown in FIG. 2 includes a resistor 14 having a resistance $R_1$ (it is to be noted that resistors shown in each drawing figure are indicated to have resistances $R_1$, $R_2$, etc.; the different numbering does not necessarily indicate different resistance values and like numbering between drawings does not necessarily indicate identical resistance values—any suitable values as would be readily known to those skilled in the art can be used). The resistor 14 provides current limiting for limiting the magnitude of a current flowing in response to the voltage differential between $V_{IN}$ and the voltage which is provided by the regulator to be substantially equal to the predetermined magnitude to which $V_O$ is to be regulated. As shown in FIG. 2, the resistor 14 has one end connected to a conductor or input terminal to which $V_{IN}$ is, or can be, applied. The other end of the resistor 14 is connected to the cathode of a Zener diode 16. The connection is made through a transistor 18 forming part of a control means of the switching control circuit 8, but physically located in line with the resistor 14 and the diode 16 of this embodiment of the power means of the power circuit 6.

The diode 16 has an anode which is connected to a reference potential, such as the electrical ground or common for the system with which the apparatus 2 is used. The diode 16 applies a predetermined voltage to an electrical conductor connected to the cathode of the diode. This voltage is predetermined by known characteristics of the Zener diode 16. In the preferred embodiment this magnitude is substantially equal to the predetermined magnitude at which $V_O$ is to be regulated. In a particular use of this invention on a diesel locomotive where $V_O$ is to be $+12$ $V_{DC}$, a Zener diode which would cause approximately $+12$ $V_{DC}$ to be held at its cathode upon actuation would be selected.

The resistor 14 and the diode 16 have intrinsic resistances which dissipate energy as current flows through these components. This dissipation occurs at a rate dependent upon the magnitude of the resistances and the currents flowing through these components. Thus, the power circuit 6 has an inherent resistance which causes power to be expended during its operation. For the aforementioned example of use on a diesel locomotive, assume that the input voltage, $V_{IN}$, is $+72$ $V_{DC}$ and that $R_1$ equals 1500 ohms and that the voltage across the diode 16, $V_Z$, is $+12$ $V_{DC}$. For these values, and ignoring the dissipation across the transistor 18, the rate of energy dissipation (i.e., the power loss) at no load for this shunt regulator is $$\frac{(V_{IN} - V_Z)^2}{R_1} + (V_Z)(I_Z) = \frac{60^2}{1500} + (12)\frac{60}{1500} = 2.88 \text{ watts}$$

A preferred embodiment of a series pass voltage regulator is shown in FIG. 3 with another preferred embodiment of the present invention. The series pass voltage regulator includes a resistor 20 and a Zener diode 22. The series pass regulator shown in FIG. 3 also includes a transistor 24 having its base and collector terminals connected across the resistor 20 and having its emitter terminal connected to the output terminal 10. The cathode of the diode 22 is connected to the junction of the resistor 20 and the base terminal of the transistor 24.

Another shunt voltage regulator is shown in FIG. 4. This embodiment has a resistor 26 and a Zener diode 28. The embodiment shown in FIG. 4 has no intervening transistor interconnecting the resistor and diode as in FIG. 2 because the resistor 26 and the diode 28 are directly connected at a common junction which is to be connected to the output terminal 10 if the shunt voltage regulator shown in FIG. 4 is used in the FIG. 3 embodiment in place of the series pass voltage regulator containing the components 20, 22, 24 (i.e., the elements 26, 28 are connected to the points A, B in place of the elements 20, 22, 24). If this alternate embodiment is used, the other end of the resistor 26 is connected to a transistor 30 which forms part of the control means for the embodiment shown in FIG. 3 and to which the resistor 20 and the collector of the transistor 24 are connected when the series pass regulator illustrated in FIG. 3 is used. It is to be noted that as a shunt regulator could be used in the FIG. 3 embodiment (which is illustrated with a series pass regulator), so a series pass regulator could be incorporated into a circuit of the type in FIG. 2 (which is shown with a shunt regulator).

The switching control circuit 8 of the apparatus 2 includes control means for enabling the application of $V_{IN}$ to the voltage regulation means of the power circuit 6 until $V_O$ is derived from $V_{IN}$ and for disabling the application of $V_{IN}$ to the voltage regulation means after $V_O$ is derived from $V_{IN}$. That is, the control means, which is responsive to $V_O$, allows current to flow through the power circuit 6 until $V_O$ reaches its regulated magnitude. Thereafter, the control means prevents the power circuit 6 from conducting current and thus from providing the initial control circuit voltage to the output 10.

The switching control circuit 8 also includes means for communicating the initial control circuit voltage to the output 10 and thus to the input 12 of the control circuit 4 when the power circuit 6 provides the initial control circuit voltage and for communicating $V_O$ to the output 10 and thus to the input 12 of the control circuit 4 when the control means prevents the power circuit 6 from providing the initial control circuit voltage so that the control circuit 4 is energized by the initial control circuit voltage until $V_O$ is provided at its regulated magnitude.

The control means for both embodiments shown in FIGS. 2 and 3 broadly includes a switch means and two switch control means. The switch means switchably connects the power circuit 6 relative to $V_{IN}$ so that the power circuit 6 is enabled to respond to $V_{IN}$ when the switch means is in an appropriate switch state. That is, the switch means allows the voltage regulation means of the preferred embodiments of the power circuit 6 to conduct current in response to $V_{IN}$ when the switch means is in a current conductive state in the preferred embodiments. Conversely, the switch means prevents such current conduction when it is in a non-conductive switch state.

In the FIG. 2 embodiment, the switch means includes the transistor 18 which has its drain and source terminals connected in line with the resistor 14 and the Zener diode 16 so that current flows through these elements when the transistor 18 is made conductive and thereby closes the electrical circuit communicating $V_{IN}$ with the resistor 14 and the Zener diode 16. In the FIG. 3 embodiment, the switch means includes the transistor 30 which is similarly connected in line with whichever one of the series pass or shunt voltage regulation means is used. The transistor 30 functions in a similar manner to the transistor 18 to provide a switchable current conduction path through which $V_{IN}$ can be communicated in a closed electrical circuit with the voltage regulation means of the power circuit 6.

One of the switch control means is responsive to $V_{IN}$ in that $V_{IN}$ is connected thereacross; however, this switch control means is also responsive to $V_O$. Prior to $V_O$ reaching its regulated magnitude, this switch control means actuates the switch means to the switch state wherein the power circuit 6 is allowed to respond to $V_{IN}$. That is, this switch control means applies to the switch means a control voltage which is responsive to $V_{IN}$ until $V_O$ reaches its regulated magnitude as derived in the preferred embodiments from the operation of the DC/DC converter switching circuits and the application of $V_{IN}$ to them.

In the FIG. 2 embodiment, this first-described switch control means includes a resistor network comprising a resistor 32 (having a resistance $R_2$) and a resistor 34 (having a resistance $R_3$). The resistors 32, 34 are connected between a reference potential terminal (e.g., system ground) and the input terminal to which $V_{IN}$ is applied when the apparatus 2 is to be operated. The resistors 32, 34 are connected in series with each other so that the commonly connected ends of these resistors define an intermediate terminal 36 to which the gate terminal, defining a switch control input, of the transistor 18 is connected.

In the FIG. 3 embodiment, this switch control means includes a resistor 38 and a resistor 40 connected in electrical series so that $V_{IN}$ can be applied thereacross. This embodiment of this switch control means also includes a transistor 42 having a gate terminal connected to an intermediate terminal 44 at the common junction of the series-connected resistors 38, 40. The source terminal of the transistor 42 is connected to a reference potential (e.g., system ground), and the drain terminal of the transistor 42 is connected to a resistor 46 which is connected at a common junction 48 to a resistor 50 having its other end connected to the conductor 10 to which $V_{IN}$ is, or is to be, applied. The junction, or intermediate terminal, 48 is connected to the gate terminal of the switch means defining transistor 30.

The other switch control means is responsive only to $V_O$. When $V_O$ reaches its predetermined regulated magnitude, this other switch control means actuates the switch means to its other switch state, wherein the power circuit 6 is prevented from responding to $V_{IN}$. More particularly, this other switch control means applies to the switch means another, different control voltage from the one applied by the first-described switch control means. This other control voltage is applied to the intermediate terminal 36 in the FIG. 2 embodiment and to the intermediate terminal 44 in the FIG. 3 embodiment. This changes the voltage at the intermediate terminal when $V_O$ reaches its regulated level.

In the FIG. 2 embodiment, this other switch control means includes a resistor network means for having $V_O$ applied thereacross. This network means includes a resistor 52 and a resistor 54 connected at an intermediate terminal 56. The end of the resistor 52 not connected to the intermediate terminal 56 is connected to receive $V_O$. Connected to the intermediate terminal 56 and forming another part of this other switch control means is a transistor 58. The gate terminal of the transistor 58 defines a switch control input which is connected to the intermediate terminal 56. The source terminal of the transistor 58 is connected to the reference potential and the drain terminal of the transistor is connected to the intermediate terminal 36 of the first-described switch control means. Thus, depending upon its conductive or non-conductive state, the transistor 58 switchably changes the voltage at the intermediate terminal 36 between that which results from the voltage division of $V_{IN}$ across the resistors 32, 34 when the transistor 58 is non-conductive and that which results from connecting the reference potential to the terminal 36 through the transistor 58 when it is conductive.

The FIG. 3 embodiment has a similar form of this other switch control means. In particular, the FIG. 3 embodiment includes a resistor 60, a resistor 62 and a transistor 64 connected in the same manner as the corresponding elements 52, 54, 58 shown in FIG. 2. The drain terminal of the transistor 64 is connected to the intermediate terminal 44 in the FIG. 3 embodiment.

The operation of these elements of the control means of the switching control circuit 8 will be more particularly described hereinbelow with reference to the operation of these embodiments. It is to be nioted here, however, that these elements of the control means generally define energy dissipating means for dissipating energy at a rate of power when the switching control circuit 8 communicates $V_O$ with the output terminal 10 to provide $V_{CC}$ at the input 12 of the control circuit 4. It is one purpose of the present invention to construct this energy dissipating means in such a way that this rate of power loss is less than the rate of power loss resulting from the energy dissipation of the power circuit 6 when it operates to provide $V_{CC}$ from $V_Z$. In the preferred embodiment, the rate of energy dissipation for the switching control circuit 8 when it is operating after $V_O$ reaches its regulated level is at least an order of magnitude less than the rate of energy dissipation of the power circuit 6 when it is operating prior to $V_O$ reaching its regulated predetermined magnitude. Because the resistors in the two illustrated embodiments of the control means are the primary energy dissipators, the values of these resistors are suitably selected relative to the value of the resistor used in the various preferred embodiments of the voltage regulation means of the power circuit 6 so that less energy is dissipated during a predetermined time period when the load 4 is being energized in response to $V_O$ than is dissipated during an equal predetermined time period when the load 4 is being energized in response to the initial control circuit voltage provided by the power circuit 6.

To provide either the initial control circuit voltage generated by the power circuit 6 or $V_O$ received by the switching control circuit 8 to the output 10 and thus to the input 12 of the load 4, the means for communicating a selectable one of these two voltages to the output 10 is used. This means includes means for connecting to the output 10 the electrical conductor to which the initial control circuit voltage generated by the power circuit 6 is applied. In both of the illustrated preferred embodiments, this means includes a diode, identified by the reference numeral 66 in FIG. 2 and by the reference numeral 68 in FIG. 3. In the FIG. 2 embodiment the anode of the diode 66 is connected to the junction of the cathode of the Zener diode 16 and the source terminal of the transistor 18, and the cathode of the diode 66 is connected to the output terminal 10. In the FIG. 3 embodiment the anode of the diode 68 is connected to either the emitter of the transistor 24 or the junction of the resistor 26 and the diode 28 depending upon which embodiment of the power circuit 6 is used. The diode acts as a current flow direction control means to allow current flow only toward the output terminal 10 and not back toward the power circuit 6.

The means for communicating also includes means for connecting to the output terminal 10 an electrical conductor to which $V_O$ is applied. This includes a diode 70 in the FIG. 2 embodiment and a diode 72 in the FIG. 3 embodiment. Both of these diodes have their anodes connected to a conductor to which $V_O$ is, or is to be, applied and their cathodes connected to the output terminal 10. Each of the diodes 70, 72 defines another current flow direction control means for allowing current flow only in a direction toward the output terminal 10 and not in a direction back toward the switching control circuit 8.

OPERATION

In the FIG. 2 embodiment, $V_{IN}$ is, as previously mentioned, a DC input voltage having a magnitude which is large relative to $V_O$, which is the regulated output voltage. Upon application of $V_{IN}$ to the apparatus 2 in its preferred embodiment shown in FIG. 2, there is insufficient voltage on the $V_O$ conductor to bias the transistor 58 on so that the transistor 58 is off (i.e., non-conductive through its source and drain terminals). This allows the resistors 32, 34 to establish a suitable voltage at the intermediate terminal 36 to bias the transistor 18 into saturation. This connects the shunt regulator in circuit with the applied $V_{IN}$ through the current limiting resistor 14 to establish at the cathode of the diode 16 the appropriate initial control circuit voltage which is communicated to the output terminal 10 through the diode 66. In the preferred embodiment the diode 16 is selected so that the voltage $V_Z$ developed at its cathode is substantially equal to the magnitude at which $V_O$ will be when it reaches its regulated level (e.g., approximately +12 $V_{DC}$ in the previously described example of a use on a diesel locomotive). Because there is a voltage drop across the diode 66, the voltage $V_{CC}$ provided from the output terminal 10 to the input terminal 12 of the converter control circuit 4 will be slightly less than the voltage $V_Z$ developed at the cathode of the diode 16.

In response to this $V_{CC}$, the converter control circuit 4 is energized to control the DC/DC switching circuit. Through this energization, the output voltage $V_O$ comes into its regulation band. When this occurs, $V_O$ biases the transistor 58 into saturation through the voltage developed across the resistors 52, 54 at the intermediate terminal 56. Saturation of the transistor 58 pulls the intermediate terminal 36 to the reference potential connected to the source terminal of the transistor 58. This turns the transistor 18 off, thereby preventing further current flow through the resistor 14 and the diode 16. Because this drops the voltage which has been communicated to the output terminal 10 by the diode 66, $V_O$ now forward biases the diode 70 so that $V_O$ is then used to provide $V_{CC}$ to the control circuit 4. The diode 66 prevents this voltage at the output terminal 10 from biasing the diode 16 on. Because the resistor 14 and the diode 16 are no longer conducting current from the high voltage $V_{IN}$, their energy dissipation is eliminated. This allows the resistor 14 to be of a much lower wattage type than would be required if the resistor 14 were to be in continuous operation.

For this FIG. 2 circuit in which the DC/DC converter starts by using a shunt regulator for control circuit power and then switches to an internally generated voltage to power the control circuit, the power savings for this operation relative to operating the shunt regulator continuously can be expressed as the ratio:

$$\frac{1 + K^2\eta}{\alpha\eta K(K - 1)}$$

Where:

$$\alpha = \frac{R_2}{R_1}\ ;\ R_2 \doteq R_4 + R_5;$$

$$K = \frac{V_{IN}}{V_Z}\ ;\ V_O \doteq V_Z$$

and $\eta$=DC/DC converter efficiency $P_{out}/P_{in}$

For the aforementioned example where $V_{IN}$ is +72 $V_{DC}$, $V_Z$ is +12 $V_{DC}$ and $R_1$ is 1500 ohms, the no-load power dissipated in the shunt regulator running continuously is 2.88 watts. Choosing an $\alpha$ of 100(=$R_2/R_1$) and a typical switching efficiency of 70% ($\eta$=0.7) and with a K of 6($V_{IN}/V_Z$=72/12), the power saving ratio is 0.01245. Multiplying this ratio by the shunt regulator dissipation of 2.88 watts indicates that it would require only about 36 milliwatts to keep the shunt regulator switched off while operating the converter control circuit 4 from a self-generated voltage of $V_O$= +12 volts.

In the FIG. 3 embodiment, start up power to the converter control circuit 4 is shown to be provided by the representative series pass regulator including the components 20, 22, 24. An alternative shunt regulator is shown in FIG. 4. While these regulators may be simple, they represent the broad families of either type of regulator that might power the converter control circuit 4 (or other suitable load).

At the application of $V_{IN}$, the resistors 38, 40 conduct, thereby biasing the transistor 42 into saturation at a safe gate voltage. With the transistor 42 conducting, the resistors 46, 50 bias the switch means transistor 30 into saturation, thereby enabling the regulator of the power circuit 6.

The transistor 64 remains off until $V_O$ achieves regulation, which occurs only after the control circuit 4 has been energized by the regulator voltage developed when the transistor 30 is conductive. As $V_O$ reaches its regulated level, it biases the transistor 64 through the resistors 60, 62 into saturation. This pulls the gate voltage on the transistor 42 to near the reference potential to which the transistor 64 is connected. The transistor 30 is consequently turned off and the converter control circuit 4 operates using $V_O$ as it provides $V_{CC}$ through the diode 72.

With the transistor 30 off the power consumption is $(V_{IN})^2/R_3+(V_O)^2/(R_5+R_6)$ for the circuit components shown in FIG. 3. Since $R_3$, $R_5$, and $R_6$ would typically have values in the thousands of ohms their dissipation would be in the low milliwatt range.

If the series pass regulator shown in FIG. 3 ran continuously, its dissipation (ignoring $I_B$) would be:

$$\frac{(V_{IN} - V_{Z1})^2}{R_7} + (V_{Z1})(I_{Z1}) + I_{CC}(V_{IN} - V_{SP}).$$

The shunt regulator shown in FIG. 4 would dissipate: $(I_{CC}+I_{Z2})^2(R_8)+(V_{Z2})(I_{Z2})$. Both of these regulator circuit dissipations could typically be several watts.

Since it is assumed that $V_O \doteq V_{SP} \doteq V_{Z2}$, then the operating current, $I_{CC}$, to the converter control circuit 4 should be substantially constant regardless of the voltage source. When $V_O$ supplies $I_{CC}$ the input power required to provide converter control circuit power is: $V_{IN}I_{IN}=V_O I_{CC}/\eta$, where the overall converter efficiency $\eta$ is typically $\geq$.7. Thus it can be seen that it is much more efficient to provide $I_{CC}$ from the internally generated $V_O$ than through series pass or shunt regulators.

The apparatus 2 described herein provides either shunt or series pass regulated power to the internal control circuitry at the start-up of the DC/DC converter. After the converter output voltage achieves regulation, the circuit disables the regulator and switches the operation of the control circuitry to the regulated output. The regulator dissipation is thereby eliminated, and the converter controls itself from its efficiently regulated output.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for providing electric power relative to a first voltage until a second voltage reaches a predetermined magnitude, comprising:

first electrical circuit means for providing to an output terminal, in response to the first voltage, a voltage substantially equal to the predetermined magnitude and less than the first voltage so that a current flows through said first electrical circuit means and said output terminal when an electrical load is connected to said output terminal and the first voltage is applied to said first electrical circuit means; and second electrical circuit means for enabling said first electrical circuit means to provide said voltage substantially equal to the predetermined magnitude until the second voltage reaches the predetermined magnitude and for thereafter providing the second voltage to said output terminal so that said current ceases flowing through said first electrical circuit means, said second electrical circuit means including:

switch means for switchably connecting said first electrical circuit means relative to the first voltage;

first switch control means, responsive to the first voltage, for actuating said switch means to a first switch state wherein said first electrical circuit means responds to the first voltage; and second switch control means, responsive to the second voltage, for actuating said switch means to a second switch state wherein said first electrical circuit means is prevented from responding to the first voltage.

2. An apparatus as defined in claim 1, wherein:

said first electrical circuit means includes first energy dissipating means for dissipating energy at a first rate when said first electrical circuit means provides said output terminal with the voltage substantially equal to the predetermined magnitude so that said current flows through said first electrical circuit means; and said switch means, first switch control means and second switch control means of said second electrical circuit means define second energy dissipating means for dissipating energy at a second rate when said second electrical circuit means provides said output terminal with the second voltage, wherein said second rate is at least an order of magnitude less than said first rate.

3. An apparatus for providing electric power relative to a first voltage until a second voltage reaches a predetermined magnitude, comprising:

first electrical circuit means for providing to an output terminal, in response to the first voltage, a voltage substantially equal to the predetermined magnitude and less than the first voltage so that a current flows through said first electrical circuit means and said output terminal when an electrical load is connected to said output terminal and the first voltage is applied to said first electrical circuit means; and second electrical circuit means for enabling said first electrical circuit means to provide said voltage substantially equal to the predetermined magnitude until the second voltage reaches the predetermined magnitude and for thereafter providing the second voltage to said output terminal so that said current ceases flowing through said first electrical circuit means, said second electrical circuit means including:

a resistor network connected between a reference potential terminal and an input terminal to which the first voltage can be applied;

first transistor means, connected to said resistor network, for switchably communicating the first voltage with said first electrical circuit means; and second transistor means, connected to said resistor network, for disabling said first transistor means from communicating the first voltage with said first electrical circuit means in response to the second voltage reaching the predetermined magnitude.

4. An apparatus for providing electric power relative to a first voltage until a second voltage is derived from the first voltage, comprising:

voltage regulation means for providing a regulated voltage to an output in response to the application of the first voltage to said voltage regulation means; and control means for enabling the application of the first voltage to said voltage regulation means until the second voltage is derived from the first voltage and for disabling the application of the first voltage to said voltage regulation means after the second voltage is derived from the first voltage, said control means including:

switch means for allowing said voltage regulation means to respond to the first voltage when said switch means is in a first switch state;

first switch control means for applying to said switch means a first control voltage responsive to the first voltage until the second voltage is derived from the first voltage so that said first control voltage places said switch means in said first switch state; and second switch control means for applying to said switch means a second control voltage responsive to the second voltage after the second voltage is derived from the first voltage so that said second control voltage places said switch means in a second switch state wherein said voltage regulation means is prevented from responding to the first voltage.

5. An apparatus as defined in claim 4, wherein:

said first switch control means includes a resistor network having an intermediate terminal, said resistor network connected to have the first voltage applied thereto;

said switch means is connected to said intermediate terminal; and said second switch control means includes means, connected to said intermediate terminal, for changing the voltage of said intermediate terminal when the second voltage is derived from the first voltage.

6. An apparatus for applying a voltage to an input of a control circuit of a means for converting a direct current input voltage, $V_{IN}$, to a regulated direct current output voltage, $V_O$, said apparatus comprising:

power means for providing from $V_{IN}$ an initial control circuit voltage having a magnitude substantially equal to the regulated magnitude of $V_O$;

control means, responsive to $V_O$, for preventing said power means from dissipating energy when the means for converting provides $V_O$; and means for communicating said initial control circuit voltage to the input of the control circuit when said power means provides said initial control circuit voltage and for communicating $V_O$ to the input of the control circuit when said control means prevents said power means from providing said initial control circuit voltage so that the control circuit is energized by said initial control circuit voltage until $V_O$ is provided at its regulated magnitude whereupon the control circuit is energized by $V_O$.

7. An apparatus as defined in claim 6, wherein said means for communicating includes:
first current flow direction control means for connecting said power means to the input of the control circuit; and
second current flow direction control means for connecting to the input of the control circuit a conductor having $V_O$ applied thereto.

8. An apparatus as defined in claim 6, wherein:
said power means includes voltage conversion means for converting $V_{IN}$ to said initial control circuit voltage, said voltage conversion means having a resistance; and
said control means includes:
first resistor network means for having $V_{IN}$ applied thereacross, said first resistor network means having an intermediate terminal;
first transistor means for providing a switchable current conduction path in line with said voltage conversion means so that a current flows through said resistance when said path is closed and $V_{IN}$ is applied to said power means, said first transistor means having a switch control input connected to said intermediate terminal of said first resistor network means;
second resistor network means for having $V_O$ applied thereacross, said second resistor network means having an intermediate terminal; and
second transistor means for switchably changing the voltage at said intermediate terminal of said first resistor network means, said second transistor means having a switch control input connected to said intermediate terminal of said second resistor network means.

9. An apparatus as defined in claim 8, wherein said resistance of said voltage conversion means dissipates energy at a first rate when said voltage conversion means converts $V_{IN}$ to said initial control circuit voltage and said first and second resistor network means dissipate energy at a second rate when $V_O$ is applied to said second resistor network means so that less energy is dissipated during a predetermined time period when the control circuit is being energized in response to $V_O$ than is dissipated during an equal predetermined time period when the control circuit is being energized in response to said initial control circuit voltage.

10. An apparatus as defined in claim 8, wherein:
said voltage conversion means includes:
a transistor connected to said first transistor means;
a resistor connected to said transistor and said first transistor means; and
a Zener diode connected to said resistor and said transistor; and
said means for communicating includes a diode connected to said transistor and the input of the control circuit.

11. An apparatus as defined in claim 8, wherein:
said voltage conversion means includes:
a resistor connected to said first transistor means; and
a Zener diode connected to said resistor; and
said means for communicating includes a diode connected to said resistor and said Zener diode and to the input of the control circuit.

12. An apparatus for providing electric power relative to a first voltage until a second voltage reaches a predetermined magnitude, comprising:
a shunt voltage regulator disposed for having the first voltage applied thereto;
a transistor connected in line with said shunt voltage regulator;
means, connected to said transistor and disposed for having the first voltage applied thereto, for biasing said transistor on so that current flows through said shunt voltage regulator and a shunt regulator output voltage is provided until the second voltage reaches the predetermined voltage;
means, connected to said transistor and disposed for having the second voltage applied thereto, for preventing said transistor from being biased on by said means for biasing so that current is prevented from flowing through said shunt voltage regulated and the shunt regulator output voltage is prevented from being provided once the second voltage reaches the predetermined voltage;
first connector means for connecting the shunt regulator output voltage to a load; and
second connector means for connecting the second voltage to the load.

13. An apparatus as defined in claim 12, wherein:
said means for biasing said transistor on includes a first set of two series connected resistors, having commonly connected ends connected to said transistor and having an end disposed for having the first voltage applied thereto and having another end disposed for having a reference potential applied thereto; and
said means for preventing said transistor from being biased on includes:
a second set of two series connected resistors, having commonly connected ends and having an end disposed for having the second voltage applied thereto and having another end disposed for having the reference potential applied thereto; and
a second transistor having a terminal connected to the commonly connected ends of said second set of resistors and having another terminal connected to the commonly connected ends of said first set of resistors and having a further terminal disposed for having the reference potential applied thereto.

14. An apparatus as defined in claim 12, wherein:
said means for biasing said transistor on includes:
a first set of two series connected resistors, having commonly connected ends and having an end disposed for having the first voltage applied thereto and having another end disposed for having a reference potential applied thereto;
a second transistor having a terminal connected to the commonly connected ends of said first set of resistors and having another terminal disposed for having the reference potential applied thereto and having a further terminal; and
a second set of two series connected resistors, having commonly connected ends connected to said first-mentioned transistor and having an end disposed for having the first voltage applied thereto and having another end connected to the further terminal of said second transistor; and said means for preventing said transistor from being biased on includes:
- a third set of two series connected resistors, having commonly connected ends and having an end disposed for having the second voltage applied thereto and having another end disposed for having the reference potential applied thereto; and
- a third transistor, having a terminal connected to the commonly connected ends of said third set of resistors and having another terminal connected to the commonly connected ends of said first set of resistors and having still another terminal disposed for having the reference potential applied thereto.

15. An apparatus for providing electric power relative to a first voltage until a second voltage reaches a predetermined magnitude, comprising:
- a voltage regulator disposed for having the first voltage applied thereto;
- a transistor connected in line with said regulator between said regulator and the first voltage;
- means, connected to said transistor and disposed for having the first voltage applied thereto, for biasing said transistor on so that current flows through said regulator and a regulator output voltage is provided until the second voltage reaches the predetermined voltage;
- means, connected to said transistor and disposed for having the second voltage applied thereto, for preventing said transistor from being biased on by said means for biasing so that current is prevented from flowing through said regulator and the regulator output voltage is prevented from being provided once the second voltage reaches the predetermined voltage;
- first connector means for connecting the regulator output voltage to a load; and
- second connector means for connecting the second voltage to the load.

16. An apparatus as defined in claim 15, wherein:

said means for biasing said transistor on includes a first set of two series connected resistors, having commonly connected ends connected to said transistor and having an end disposed for having the first voltage applied thereto and having another end disposed for having a reference potential applied thereto; and said means for preventing said transistor from being biased on includes:
- a second set of two series connected resistors, having commonly connected ends and having an end disposed for having the second voltage applied thereto and having another end disposed for having the reference potential applied thereto; and
- a second transistor having a terminal connected to the commonly connected ends of said second set of resistors and having another terminal connected to the commonly connected ends of said first set of resistors and having a further terminal disposed for having the reference potential applied thereto.

17. An apparatus as defined in claim 15, wherein:

said means for biasing said transistor on includes:
- a first set of two series connected resistors, having commonly connected ends and having an end disposed for having the first voltage applied thereto and having another end disposed for having a reference potential applied thereto;
- a second transistor having a terminal connected to the commonly connected ends of said first set of resistors and having another terminal disposed for having the reference potential applied thereto and having a further terminal; and
- a second set of two series connected resistors, having commonly connected ends connected to said first-mentioned transistor and having an end disposed for having the first voltage applied thereto and having another end connected to the further terminal of said second transistor; and said means for preventing said transistor from being biased on includes:
- a third set of two series connected resistors, having commonly connected ends and having an end disposed for having the second voltage applied thereto and having another end disposed for having the reference potential applied thereto; and
- a third transistor, having a terminal connected to the commonly connected ends of said third set of resistors and having another terminal connected to the commonly connected ends of said first set of resistors and having still another terminal disposed for having the reference potential applied thereto.

* * * * *